US012168891B2

(12) United States Patent
Hori et al.

(10) Patent No.: US 12,168,891 B2
(45) Date of Patent: Dec. 17, 2024

(54) MECHANICAL KEY AND CARD KEY

(71) Applicant: KABUSHIKI KAISHA TOKAI RIKA DENKI SEISAKUSHO, Aichi (JP)

(72) Inventors: Hideaki Hori, Aichi (JP); Kenji Kaihara, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 195 days.

(21) Appl. No.: 17/800,332

(22) PCT Filed: Mar. 19, 2020

(86) PCT No.: PCT/JP2020/012304
§ 371 (c)(1),
(2) Date: Aug. 17, 2022

(87) PCT Pub. No.: WO2021/186671
PCT Pub. Date: Sep. 23, 2021

(65) Prior Publication Data
US 2023/0062892 A1 Mar. 2, 2023

(51) Int. Cl.
*E05B 49/00* (2006.01)
*E05B 19/00* (2006.01)

(52) U.S. Cl.
CPC ........ *E05B 49/002* (2013.01); *E05B 19/0082* (2013.01)

(58) Field of Classification Search
CPC ...... E05B 49/00; E05B 49/002; E05B 49/004; E05B 49/006; E05B 49/008; E05B 19/00; E05B 19/0082
USPC ........................................................ 70/456 R
See application file for complete search history.

(56) References Cited

U.S. PATENT DOCUMENTS 4,677,835 A * 7/1987 Almblad ................ E05B 19/26
70/456 R

FOREIGN PATENT DOCUMENTS

| | | | | |
|---|---|---|---|---|
| EP | 0240804 | A2 | * | 10/1987 |
| JP | 2007009555 | A | * | 1/2007 |
| JP | 2007284878 | A | * | 11/2007 |
| JP | 4865390 | B2 | | 2/2012 |
| JP | 2015-71894 | | | 4/2015 |
| JP | 2015071894 | A | * | 4/2015 |

OTHER PUBLICATIONS

International Search Report issued in International Bureau of WIPO Patent Application No. PCT/JP2020/012304, dated May 12, 2020, along with an English translation thereof.
Office Action Issued in Corresponding JP Patent Application No. 2022-507960, dated Jul. 18, 2023, along with an English translation thereof.

* cited by examiner

*Primary Examiner* — Nathan Cumar
(74) *Attorney, Agent, or Firm* — Greenblum & Bernstein, P.L.C.

(57) ABSTRACT

A mechanical key includes a key pattern recessed in the mechanical key in a thickness direction and key segments separable in the thickness direction. At least one of the key segments includes a key pattern slit. The key pattern slit extends through the at least one of the key segments in the thickness direction and is shaped in conformance with the key pattern.

5 Claims, 3 Drawing Sheets

MECHANICAL KEY AND CARD KEY

TECHNICAL FIELD

The present invention relates to a mechanical key and a card key.

BACKGROUND ART

A vehicle or the like may be provided with a mechanical key that is used when, for example, the battery of a wireless portable key drains. Such a mechanical key can be separated into key segments in the thickness direction and held in the separated state in a card case that serves as a card key (refer to, for example, Patent Document 1). The card key allows a user to carry the mechanical key held in a thin state.

Patent Document 1: Japanese Patent No. 4865390

SUMMARY

The above mechanical key includes a key pattern recessed in the thickness direction. The key pattern is shaped in only one of the key segments. In the mechanical key, a side wall shaped in conformance with a pattern unique to the key, and the bottom of the key pattern are formed in one of the key segments. Thus, the manufacture of the mechanical key with a reduced thickness is difficult.

It is an objective of the present invention to provide a mechanical key and a card key that allow for easy manufacturing and are reduced in thickness.

A mechanical key that achieves the above objective includes a key pattern recessed in the mechanical key in a thickness direction and key segments separable in the thickness direction. At least one of the key segments includes a key pattern slit, the key pattern slit extends through the at least one of the key segments in the thickness direction and is shaped in conformance with the key pattern.

With this structure, the key pattern slit extends through at least one of the key segments in the thickness direction and is shaped in conformance with the key pattern. The at least one of the key segments does not include the bottom portion of the key pattern. In contrast with a key segment including, for example, the bottom portion, the at least one of the key segments has a reduced thickness while obtaining the depth of the key pattern. Thus, the at least one of the key segments can be easily manufactured through punching.

A card key that achieves the above objective includes the mechanical key and a card case including accommodating portions that hold the key segments in a state separated and arranged in a direction that is orthogonal to the thickness direction.

With this structure, the mechanical key is allowed to be held in a thin state and carried by a user in addition to the advantages of the mechanical key.

The mechanical key and the card key of the present invention allow for easy manufacturing and are reduced in thickness.

DESCRIPTION OF EMBODIMENTS

A card key according to one embodiment will now be described with reference to the drawings.

Figure 1:
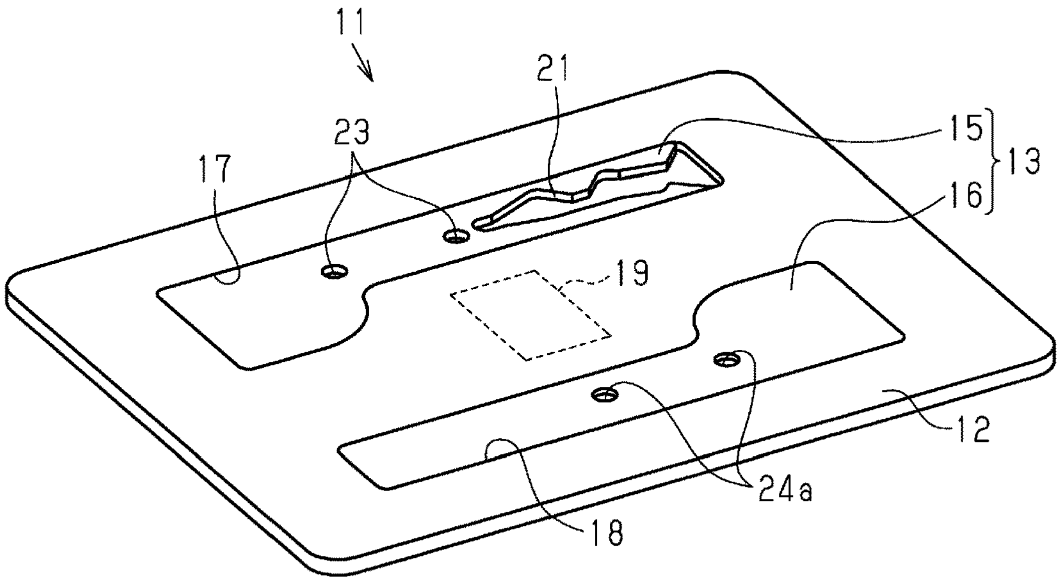
FIG. 1 is a perspective view of a card key according to one embodiment.
Figure 2:
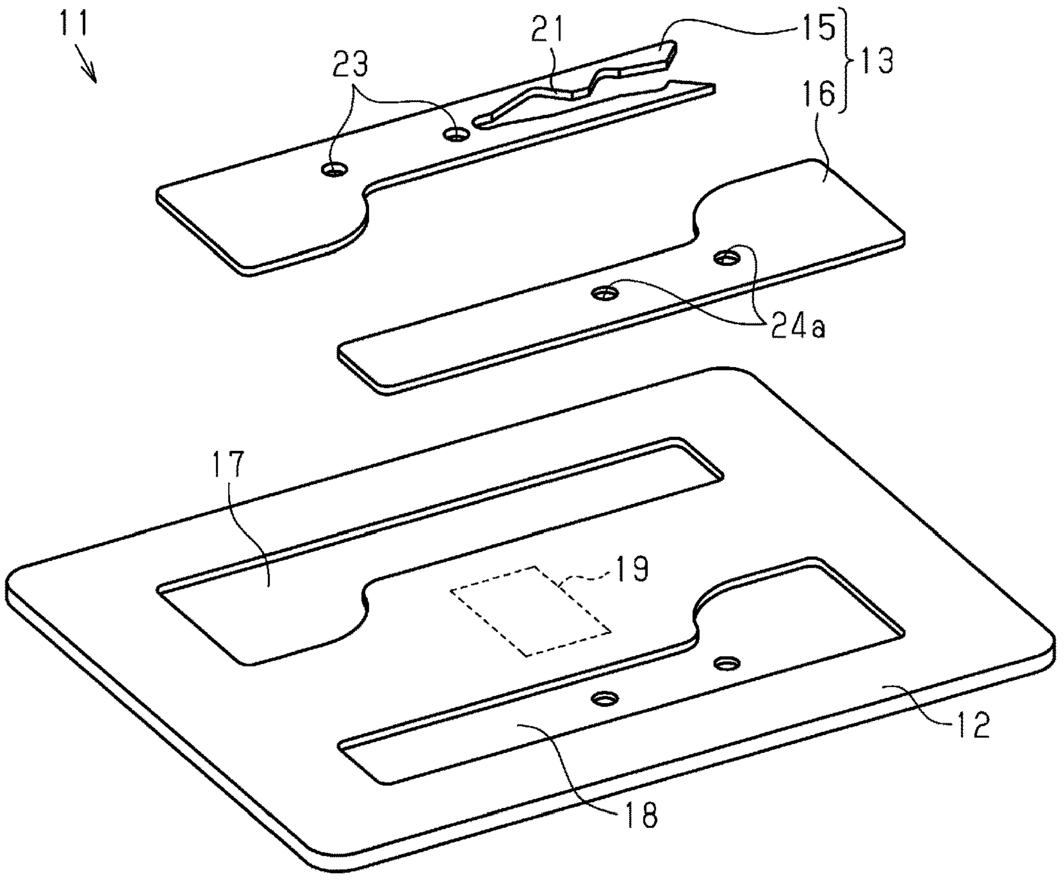
FIG. 2 is an exploded perspective view of the card key according to the embodiment.

As illustrated in FIGS. 1 and 2, a card key 11 includes a card case 12 and a mechanical key 13 that can be accommodated and held in the card case 12.

Figure 3:
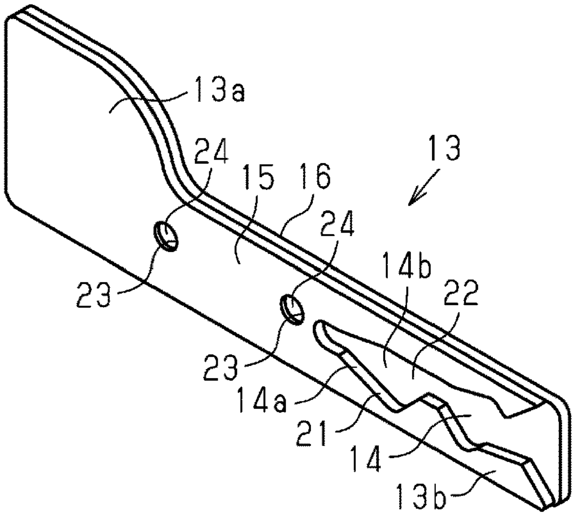
FIG. 3 is a perspective view of a mechanical key according to the embodiment.

As illustrated in FIG. 3, the mechanical key 13 includes a key pattern 14 recessed in the thickness direction. Specifically, the mechanical key 13 is flat and includes a grip portion 13*a* and a key portion 13*b* extending from the grip portion 13*a*. The key pattern 14 extends from the distal end of the key portion 13*b* toward the grip portion 13*a* and is recessed in the thickness direction.

Figure 4:
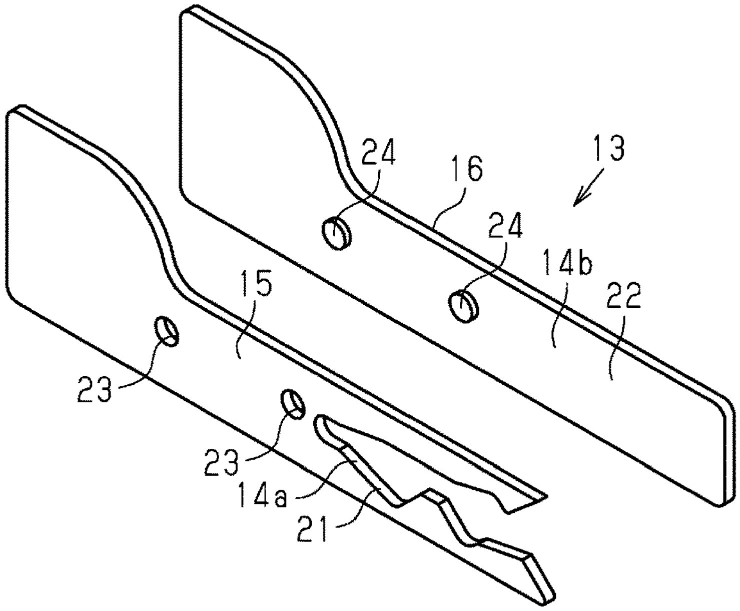
FIG. 4 is an exploded perspective view of the mechanical key according to the embodiment.

As illustrated in FIG. 4, the mechanical key 13 is separable in the thickness direction into two key segments, namely, a first key segment 15 and a second key segment 16.

As illustrated in FIG. 2, the card case 12 includes accommodating portions 17, 18 that hold the first key segment 15 and the second key segment 16 in a state separated and arranged in a direction that is orthogonal to the thickness direction. The accommodating portions 17, 18 of the present embodiment are recessed in the thickness direction of the card case 12 so that the first key segment 15 and the second key segment 16 are receivable in the thickness direction. The card case 12 of the present embodiment incorporates, for example, a communication device 19 applicable to a transponder or Near Field Communication (NFC).

A key pattern slit 21 shaped in conformance with the key pattern 14 extends through the first key segment 15 in the thickness direction. More specifically, the key pattern 14 recessed in the thickness direction of the mechanical key 13 includes a side wall 14*a* shaped in conformance with a unique pattern of the key pattern 14 and a bottom portion 14*b* that is the bottom in the recessed direction. The side wall 14*a* of the key pattern 14 is formed by the key pattern slit 21 of the first key segment 15. The bottom portion 14*b* of the key pattern 14 is formed by a flat surface 22 of the second key segment 16.

As illustrated in FIG. 4, the first key segment 15 and the second key segment 16 include female fitting portions 23 or male fitting portions 24, which serve as fitting portions that are fitted together in the thickness direction. Specifically, the first key segment 15 includes the female fitting portions 23 extending through in the thickness direction. Two female fitting portions 23 are arranged in the longitudinal direction of the first key segment 15. The second key segment 16 includes the male fitting portions 24 projecting in the thickness direction. Two male fitting portions 24 are arranged in the longitudinal direction of the second key segment 16. The surface of the second key segment 16 at the side opposite to the side of the male fitting portions 24 includes recesses 24*a* (refer to FIGS. 1 and 2) formed to push out and shape the male fitting portions 24. The first key segment 15 and the second key segment 16 can be used as the mechanical key 13 when combined by fitting the male fitting portions 24 into the female fitting portions 23.

The first key segment 15 and the second key segment 16 are formed separately. Specifically, the first key segment 15 is formed through punching so that the key pattern slit 21 is shaped in conformance with a unique pattern of the key pattern 14, which differs from other mechanical keys 13. Further, the second key segment 16 is irrelevant to the pattern of the key pattern 14 and formed through punching as a common part.

The operation of the present embodiment will now be described.

When the mechanical key 13 does not need to be used, the first key segment 15 and the second key segment 16 are separated and arranged in a direction that is orthogonal to the thickness direction and accommodated and held in the accommodating portions 17, 18 of the card case 12. This allows the mechanical key 13 to be held in a thin state and carried by a user as a thin card key 11.

When the mechanical key 13 needs to be used, the first key segment 15 and the second key segment 16 are removed from the card case 12. Then, the male fitting portions 24 are fitted to the female fitting portions 23 to combine the first key segment 15 and the second key segment 16. This allows the user to use the mechanical key 13.

The advantages of the present embodiment will now be described.

(1) The mechanical key 13 includes the first key segment 15 and the second key segment 16 that are separable in the thickness direction. The key pattern slit 21 extends through the first key segment 15 in the thickness direction and is shaped in conformance with the key pattern 14. The first key segment 15 does not include the bottom portion 14*b* of the key pattern 14. In contrast with a key segment including, for example, the bottom portion, the first key segment 15 has a reduced thickness while obtaining the depth of the key pattern 14. Since the key pattern slit 21 extends through the first key segment 15 in the thickness direction, the first key segment 15 can be easily manufactured through, for example, punching. If, for example, the first key segment 15 were to include the bottom portion 14*b* of the key pattern 14, the first key segment 15 cannot be manufactured through punching. However, the first key segment 15 does not include the bottom portion 14*b*. Thus, the first key segment 15 can be easily manufactured through punching.

(2) The first key segment 15 and the second key segment 16 are formed separately rather than being formed integrally. Thus, for example, only the first key segment 15 includes the key pattern slit 21 shaped in conformance with a unique pattern of the key pattern 14. The second key segment 16 that does not include the key pattern slit 21 is irrelevant to the pattern of the key pattern 14 and can be manufactured as a common part.

(3) The first key segment 15 and the second key segment 16 include the female fitting portions 23 or the male fitting portions 24, which serve as fitting portions that are fitted together in the thickness direction. This allows the first key segment 15 and the second key segment 16 to be positioned and combined properly so that the mechanical key 13 is used in a satisfactory manner.

(4) The card key 11 includes the mechanical key 13 and the card case 12. The card case 12 includes the accommodating portions 17, 18 that hold the first key segment 15 and the second key segment 16 in a state separated and arranged in a direction that is orthogonal to the thickness direction. This allows the mechanical key 13 to be held in a thin state and carried by a user.

The present embodiment may be modified as follows. The present embodiment and the following modified example can be combined as long as the combined modifications are technically consistent with each other.

Figure 5:
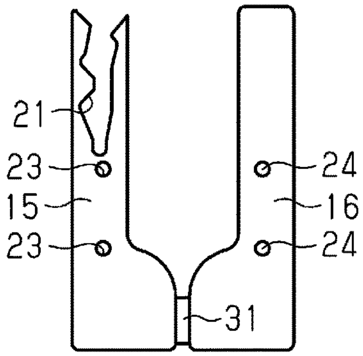
FIG. 5 is a plan view illustrating a state where a mechanical key in a modified example is spread apart.

In the above embodiment, the first key segment 15 and the second key segment 16 are formed separately rather than being integrally formed. However, as illustrated in FIG. 5, the first key segment 15 and the second key segment 16 may be formed integrally with a thin hinge 31. In this case, the mechanical key 13 includes a single component and prevents a situation in which one of the first key segment 15 and the second key segment 16 becomes lost.

In the above embodiment, the first key segment 15 and the second key segment 16 include the female fitting portions 23 or the male fitting portions 24, which serve as fitting portions that are fitted together in the thickness direction. However, the female fitting portions 23 and the male fitting portion 24 may be omitted. The shape and the quantity of the female fitting portions 23 and the male fitting portions 24 may be changed.

In the above embodiment, an adhesive film may be applied to the card key 11 when the first key segment 15 and the second key segment 16 are accommodated in the accommodating portions 17, 18 of the card case 12. Further, the accommodating portions 17, 18 may be shaped to fix the first key segment 15 and the second key segment 16 through press-fitting or a manner allowing for engagement. In the above embodiment, the accommodating portions 17, 18 are recessed in the thickness direction of the card case 12. Instead, the accommodating portions 17, 18 may be recessed in a direction that is orthogonal to the thickness direction, so that the first key segment 15 and the second key segment 16 are receivable in the orthogonal direction.

In the above embodiment, the key pattern 14 of the mechanical key 13 is of an inner groove type (refer to FIG. 3) shaped at the inner side of the key portion 13*b* in the width direction. Instead, the key pattern 14 may be of any type as long as the key pattern 14 is recessed in the thickness direction to shape a unique pattern when viewed in the thickness direction.

Figure 6:
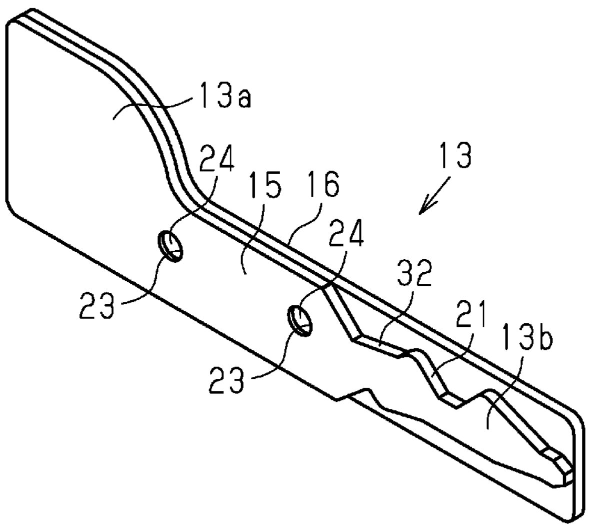
FIG. 6 is a perspective view of the mechanical key in a modified example.

As illustrated in FIG. 6, for example, a key pattern 32 may be of an outer ridge type formed at two sides of the key portion 13*b* in the width direction.

Figure 7:
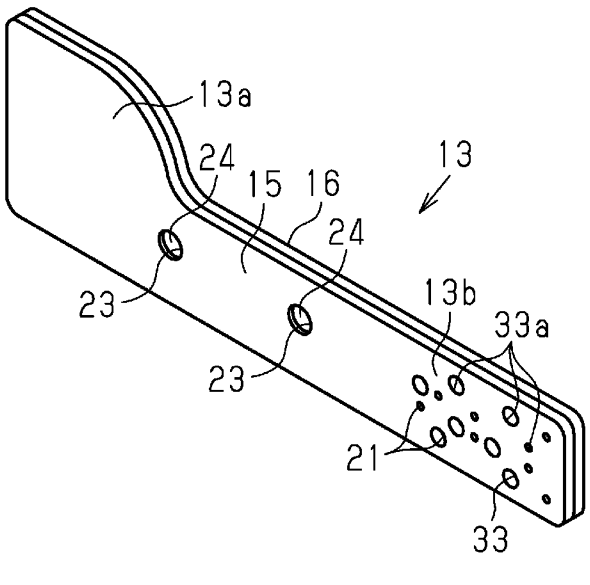
FIG. 7 is a perspective view of the mechanical key in a modified example.

Further, as illustrated in FIG. 7, for example, a key pattern 33 may be of a dimple type including multiple separate key recesses 33*a*.

In the above embodiment, the mechanical key 13 is separable in the thickness direction into the first key segment 15 and the second key segment 16. Instead, the mechanical key 13 may be separable into three or more key segments. For example, the mechanical key may include key patterns on the two opposite surfaces and be separable into three key segments in the thickness direction. A key pattern slit may extend through two key segments corresponding to the two opposite surfaces of the mechanical key in the thickness direction.

In the above embodiment, the first key segment 15 and the second key segment 16 are formed through punching. Instead, the first key segment 15 and the second key segment 16 may be formed through any manufacturing method.

In the above embodiment, the card case 12 includes the communication device 19. However, the card case does not need to include the communication device 19.

The invention claimed is:

1. A mechanical key, comprising:

a key pattern recessed in the mechanical key in a thickness direction; and key segments separable in the thickness direction, wherein the key segments include:

a first key segment including a key pattern slit, wherein the key pattern slit extends through the first key segment in the thickness direction and is shaped in conformance with the key pattern, and wherein the first key segment includes a side wall of the key pattern defined by the key pattern slit, and a second key segment including a bottom portion of the key pattern exposed from the key pattern slit of the first key segment in a state in which the key segments are combined to one another.

2. The mechanical key according to claim 1, wherein the key segments are formed separately.

3. The mechanical key according to claim 1, further comprising a thin hinge with which the key segments are formed integrally.

4. The mechanical key according to claim 1, wherein the key segments include fitting portions that are fitted together in the thickness direction.

5. A card key, comprising:

the mechanical key according to claim 1; and a card case including accommodating portions that hold the key segments in a state separated and arranged in a direction that is orthogonal to the thickness direction.

* * * * *